July 19, 1949.  J. A. MAYTUM  2,476,504
CONTINUOUS FEED KINEMATOGRAPH APPARATUS
Filed May 13, 1947  2 Sheets-Sheet 1
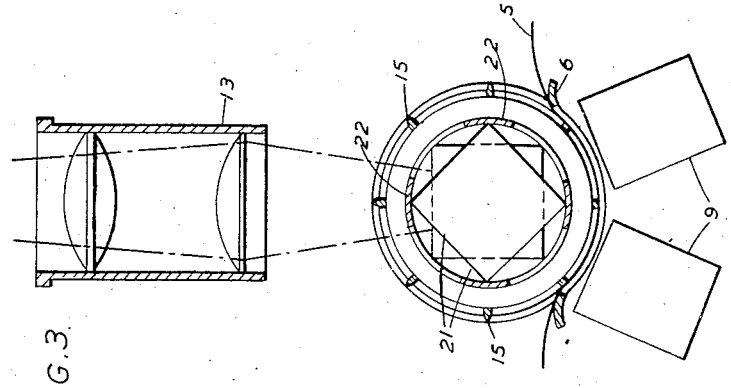
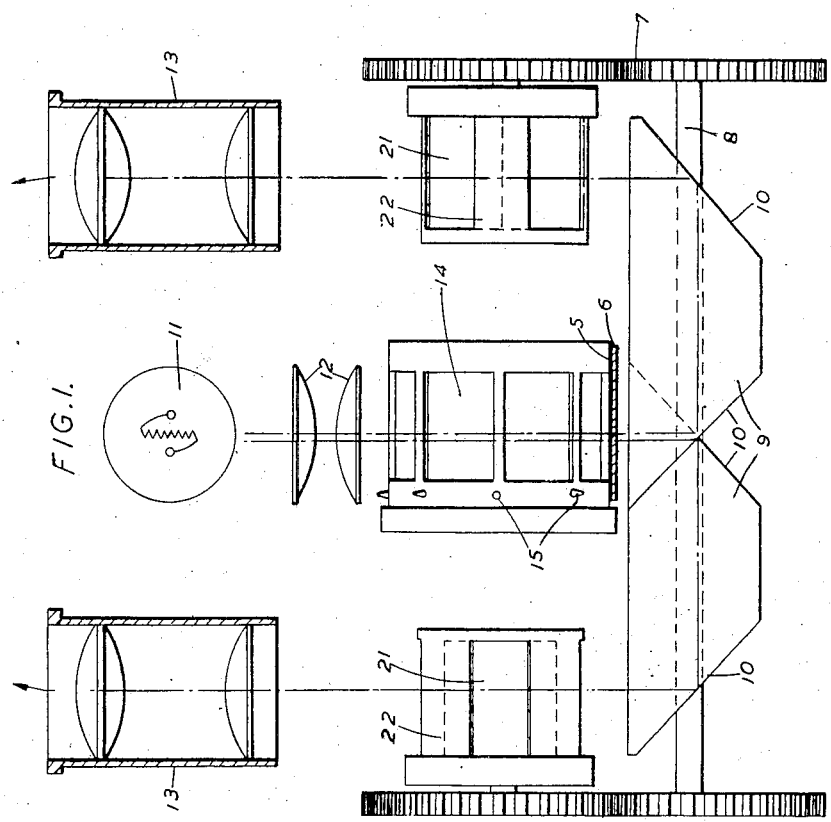
INVENTOR
JAMES A. MAYTUM
BY
ATTY.

July 19, 1949.  J. A. MAYTUM  2,476,504
CONTINUOUS FEED KINEMATOGRAPH APPARATUS

Filed May 13, 1947  2 Sheets-Sheet 2

INVENTOR
JAMES A. MAYTUM
BY
ATTY.

Patented July 19, 1949

2,476,504

UNITED STATES PATENT OFFICE 2,476,504

CONTINUOUS FEED KINEMATOGRAPH APPARATUS

James Archibald Maytum, London, England

Application May 13, 1947, Serial No. 747,681
In Great Britain February 23, 1945

Section 1, Public Law 690, August 8, 1946
Patent expires March 25, 1966

6 Claims. (Cl. 88—16.8)

The present invention relates to continuous feed kinematographic apparatus having a uniformly rotating compensating prism operating in synchronism with the regular film movement to obtain the transmission of a succession of stationary images notwithstanding the uniform and continuous feed of the film through the apparatus.

In the specification of co-pending application Ser. No. 582,396, filed March 12, 1945, a compensating prism is described comprising a square section refractor prism and a surrounding shutter which confines the operative part of the prism to one face at a time, said prism being driven continuously at a speed related to the passage of the film through the apparatus. The shutter serves to interrupt the transmission of light during transition from one facet to the next but it has the effect of slightly reducing the total amount of light reaching the screen.

The present invention is more particularly concerned with a kinematograph film projector and in this aspect the invention has for its object to provide for the reproduction of an improved image which is substantially free from flicker and whereby a greater proportion of light is transmitted giving a brighter picture than has been possible heretofore.

The present invention also includes apparatus for stereoscopic kinematography and in this aspect the invention includes both cameras and projectors. As applied to stereoscopic kinematography the invention aims at providing apparatus of the continuous feed type which gives a satisfactory stereoscopic image and in which flicker is reduced to a minimum.

In accordance with the present invention kinematograph projecting apparatus is provided including one or more compensating prisms of square section form and means for producing duplicate light paths through the apparatus corresponding to successive areas of the film whereby the two paths are used alternately and one path takes over the projection while the other path is ineffective during the transition from one facet of the prism to the next and with a period of overlap while both paths are effective.

In a modification of the invention applied to a projector or a camera for stereoscopic kinematography one or more compensating prisms are provided of square section with means for producing duplicate light paths through the camera onto the sensitive film or through the projector towards a screen, the two paths being used for the transmission of the component right and left hand images to or from the film and the component images being recorded on the film in alternate series.

In carrying the invention into effect it is possible to use two compensator prisms arranged at an angle one to the other in which case the two light paths may be substantially parallel one with the other and each subjected to the compensating action of one of the prisms, or a single compensator prism can be used with the two light paths directed at an angle one to the other through the said prism, suitable means being provided to cause the two paths to converge onto the screen, or, in the case of a camera for stereoscopic kinematography, to deviate the incoming light into the requisite paths.

The rotary compensating prisms are each provided with an enclosing shutter as described in specification No. 582,396 covering the corners of the prisms and serving to interrupt the transmission of light during the transition from one facet to the next although other equivalent means could be provided to perform such interruption.

The invention will be further described with reference to the accompanying drawings illustrating diagrammatically the essential parts of continuous feed kinematograph projectors according to the present invention, and in which;

Fig. 1 is a plan view looking down on a projector,

Fig. 3 is a side elevation of Fig. 1, showing the compensator prisms, the deviating prisms and the objective.

Figure 2:
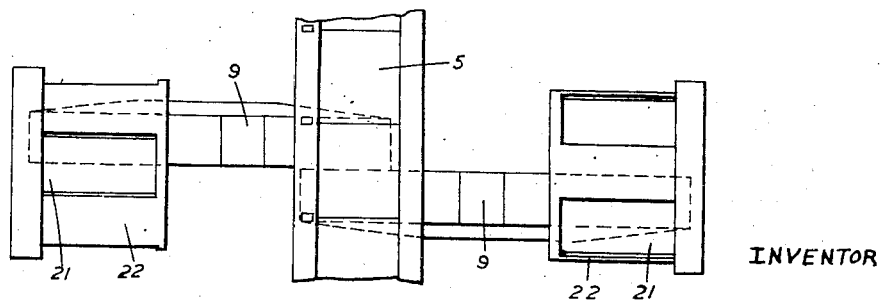
Fig. 2 is a front elevation showing the compensator prisms and the deviating prisms.

Referring first to Figs. 1 to 3, the film 5 is fed continuously over a film guide 6 from a feed spool not shown and is wound onto a take up spool in the usual manner; the means for driving the film continuously being operated by hand or by electric motor drive or in any other convenient manner. Driven continuously in synchronism with the film movement through any suitable system of drive is a pair of rotary compensating prisms 21 of square section arranged to effect compensation for the regular movement of the film to obtain kinematographic projection in the manner described in the specification of application No. 582,396 and said prisms are enclosed in shutter members 22 as described in said specification.

The compensating prisms are coaxially arranged and may be mounted on a common drive shaft or as shown on the drawing they are driven by suitable gearing 7 from a drive shaft 8 at the rear of the projector, said drive shaft being driven continuously through suitable gearing from the main drive mechanism which also performs the feed of the film in continuous manner through the projector. The two prisms 21 are set at an angle one to the other preferably at an angle of 45° so that projection can be effective through one of the prisms while the shutter 22 of the other prism is performing interruption or limitation of the projection during the period of transition from one facet to the next.

The light transmitted through the film is divided into two beams by two deviating prisms 9 having silvered reflecting surfaces 10 whereby the beams are turned twice successively in the same direction through 90°. A light source 11 and condenser lens system 12 is arranged in front of the film and the prisms 9 are arranged circumferentially around the film guide 6 in the manner indicated more especially in Fig. 3 whereby successive portions of the film at any particular instant are illuminated by the light source 11 and the corresponding beams are projected simultaneously through the prisms 9 and towards the compensator prisms. One of the compensator prisms 21 may at any instant be partially or wholly obscured by the shutter 22 concerned but the other portion of film is projected through the other compensator prism 21 of which the relevant shutter is necessarily in the position which permits projection. Subsequently when the film has moved somewhat the actions of the two prisms 21 will have changed due to the continuous movement thereof, the first prism now performing the projection while the said other prism is partially or wholly obscured by its shutter. Furthermore the arrangement is such that one prism 21 will have taken over the projection before the other prism has ceased its projection function; with the result that projection is substantially continuous, resulting in a projection which is substantially free from flicker and resulting further in the transmission of a greater amount of light than is possible with one compensating prism and giving a brighter projected image for a given light source.

The light leaving the compensating prisms 21 may be transmitted to separate projection objectives 13 and to register the images from the two objectives on the screen one or both of said objectives may be provided in an adjustable mount permitting fine and accurate adjustment in all directions; alternatively or in addition one or both of the prisms 9 may be adjustable for the same purpose.

According to a further feature a drum 14 is mounted between the light source and the film guide and said drum is provided with cross bars defining window spaces which coincide with the frame area of the film to be projected and which drum moves in synchronism with the film; being driven for instance by the film itself by means of sprocket teeth 15 adapted to enter the apertures in the film. The cross bars of the drum coincide with the spaces between the film frames and serve to define the frame area accurately during projection and thereby define the projected area of the film to the effective picture area giving accurate framing of the image on the screen. Instead of arranging the light source 11 and condenser 12 outside the drum 14 so that the light has to traverse said drum diametrically the light source could be disposed within the drum itself or a rhomboid prism could be disposed within the drum to direct a beam of light from an external light source firstly along or parallel to the axis of the drum and then outwardly towards the film guide 6 so as to traverse the drum 14 once only.

Heretofore an arrangement has been described including two co-axial compensator prisms 21 set so that a face of one corresponds in position with a vertex of the other and through which light beams are transmitted on axes which are substantially parallel one to the other; but the invention may also provide means for directing separate component beams through a single compensator prism said beams being at a substantial angle one to the other for example at 45°, whereby substantially the same result is obtained as by using two prisms. An embodiment of this character is shown on Fig. 4 of the accompanying drawings wherein a light source 11 and condenser lens 12 are arranged behind the film guide 6. On the opposite side of the guide 6 is a single compensator prism 21 with shutter 22 as in the foregoing examples. A second source of projection light is provided adapted to produce a projecting beam intersecting that produced by source 11 and condenser 12 at the axis of rotation of prism 21. Said projection beam could be produced from the light source 11 as shown by means of a reflector prism 17 and a second condenser 18. Separate objectives 13 and 19 are provided for the projection beam produced by the condenser 12 and that produced by the condenser 18 and prism 17. Beyond the objective 19 is provided a double reflection prism 20 which serves to turn the projection beam in such manner as to converge upon the beam produced by the objective 13 so that the two images can be made to come to a focus in coincidence on the projection screen. The double reflection feature of the prism 20 secures re-inversion of the projected image; the first reflection being by internal reflection and the second may be at the silvered surface 23.

Preferably the prism 20 is finely adjustable so as to permit regulation of the coincidence of the two images on the screen and permit the said images to be brought into exact registration.

It will be appreciated that, just as in the foregoing construction, projection through one objective is effective during the non-projecting phase of the other objective due to the presence of the shutter 22 and while a further facet is coming into the position in which compensation is effective, after which the other objective takes over the projection so that continuous projection is secured, one objective taking over the projection before the other has finished projecting and so alternately.

The kinematographic apparatus described herein is also applicable to stereoscopic kinematography by methods wherein right and left hand images are recorded alternately on the film and are projected alternately onto a screen adapted to record the two images and present them to the viewer as a stereoscopic image. In the application of the embodiment shown in Figs. 1 to 3 to stereoscopic projection the two compensating prisms 21 each transmit one of the component views produced by illuminating the two series of images placed alternately on the film. To secure this effect the film is fed through the projector at a speed determined by the passage of successive film frames of the same series of images in relation to the speed of rotation of the compensator prisms; that is, at twice the speed for the same assumed speed of the compensator prisms. With this arrangement one image is being projected while the complementary image is blanked out by the action of the shutter 22 concerned, whereafter the complementary image is blanked out and the former image projected but the projection of the two images overlaps in time to some extent. The arrangement of Fig. 4 may also be applied to stereoscopic projection using a film with alternately arranged component images running at a multiple of the speed at which a non-stereoscopic film would run.

Of course for stereoscopic projection whatever means of adjustment is provided for the two projection beams (i. e. objectives 13 or prisms 9 in Figs. 1 to 3 or objectives 13 or 19 or prism 20 in Fig. 4) it would be so regulated in conjunction with the image focussing to secure the desired stereoscopic effect.

Figure 4:
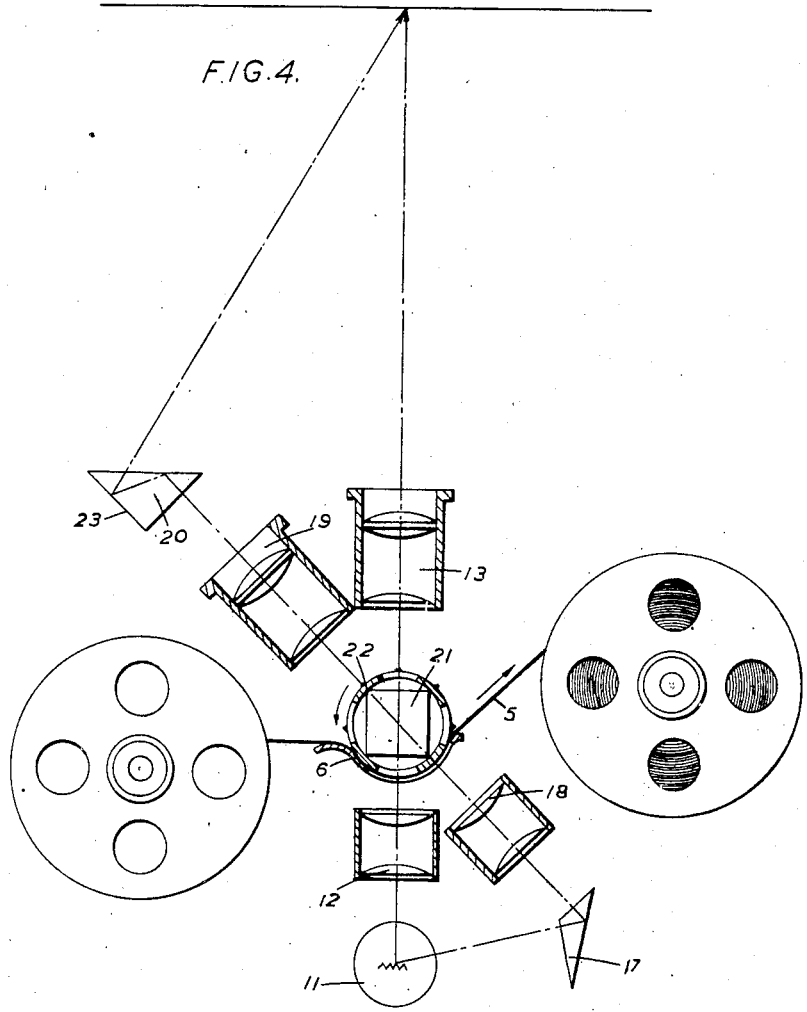
Fig. 4 is a general view in side elevation of a further embodiment of the invention using a single compensator prism.

As applied to stereoscopic kinematography the invention also includes a stereoscopic taking camera having substantially the same arrangement of the compensating prisms as shown on the drawings as well as the deviating prisms 9 in Figs. 1 to 3 and the prism 20 of Fig. 4. The objectives 13 or 19 will of course be replaced by camera objectives while of course the sensitive film will be suitably enclosed to prevent stray light reaching the sensitive surface and to confine the light to the required picture areas. Further an exposure shutter similar to shutter 79 of Fig. 12 of co-pending application No. 582,396 would preferably be provided further to confine and restrict the exposure light to the required areas of the film.

What I claim is:

1. A continuous film feed motion picture apparatus for use with a film having successive image areas, comprising a film gate past which film having successive image areas may be continuously moved, means in front of said film gate for simultaneously creating two spaced independent optical image beams between an image plane and successive image areas of a film at the film gate, an objective in each of said image beams for focusing an image in registry between the image plane and a film at the film gate, and a rotatable compensating prism in each of said image beams and respectively including shutter elements for interrupting the respective beams during transition from one facet of the respective prism to the next, said compensating prisms and shutter elements being relatively displaced so that the prism elements will transmit their respective beams while the other of the beams is interrupted by the respective shutter element, whereby beams are continuously transmitted between an image plane and a film at the film gate and their respective images are alternately transmitted.

2. A continuous feed film motion picture apparatus for use with a film having successive image areas, comprising a film gate past which film having successive image areas may be continuously moved, means in front of said film gate for simultaneously creating two spaced independent optical image beams between an image plane and successive image areas of a film at the film gate, an objective in each of said image beams for focusing an image in registry between the image plane and a film at the film gate, and a square rotatable compensating prism in each of said image beams and respectively including shutter elements for interrupting the respective beams during transition from one facet of the respective prism to the next, said compensating prisms and shutter elements being relatively displaced at an angle of 45° so that the prism elements will transmit their respective beams while the other of the beams is interrupted by the respective shutter element, whereby beams are continuously transmitted between an image plane and a film at the film gate and their respective images are alternately transmitted.

3. A continuous film feed motion picture apparatus for use with a film having successive image areas, comprising a film gate past which film having successive image areas may be continuously moved, means in front of said film gate for simultaneously creating two independent substantially parallel spaced optical image beams between an image plane and successive image areas of a film at the film gate, an objective in each of said image beams for focusing an image in registry between the image plane and a film at the film gate, and a rotatable compensating prism in each of said image beams and respectively including shutter elements for interrupting the respective beams during transition from one facet of the respective prism to the next, said compensating prisms and shutter elements being relatively displaced so that the prism elements will transmit their respective beams while the other of the beams is interrupted by the respective shutter element, whereby beams are continuously transmitted between an image plane and a film at the film gate and their respective images are alternately transmitted.

4. A continuous film feed motion picture apparatus for use with a film having successive image areas, comprising a film gate past which film having successive image areas may be continuously moved, dividing prisms in front of said film gate for simultaneously creating two spaced independent parallel optical image beams between an image plane and successive image areas of a film at the film gate, an objective in each of said image beams for focusing an image in registry between the image plane and a film at the film gate, and a rotatable compensating prism in each of said image beams and respectively including shutter elements for interrupting the respective beams during transition from one facet of the respective prism to the next, said compensating prisms and shutter elements being relatively displaced so that the prism elements will transmit their respective beams while the other of the beams is interrupted by the respective shutter element, whereby beams are continuously transmitted between an image plane and a film at the film gate and their respective images are alternately transmitted.

5. A continuous film feed motion picture apparatus for use with a film having successive image areas, comprising a film gate past which film having successive image areas may be continuously moved, means in front of said film gate for simultaneously creating two spaced independent optical image beams between an image plane and successive image areas of a film at the film gate, an objective in each of said image beams for focusing an image in registry between the image plane and a film at the film gate, and a rotatable compensating prism in each of said image beams and respectively including shutter elements for interrupting the respective beams during transition from one facet of the respective prism to the next, said compensating prisms and shutter elements being coaxially positioned by a common shaft mounting and relatively displaced so that the prism elements will transmit their respective beams while the other of the beams is interrupted by the respective shutter element, whereby beams are continuously transmitted between an image plane and a film at the film gate and their respective images are alternately transmitted.

6. A continuous film feed motion picture apparatus for use with a film having successive image areas, comprising means for continuously moving a film, a film guiding drum having openings corresponding to the successive image areas of the film and around which the film may be continuously moved, said drum being freely mounted to be driven by the film, means in front of said film gate for simultaneously creating two spaced independent optical image beams between an image plane and successive image areas of a film at the film gate, an objective in each of said image beams for focusing an image in registry between the image plane and a film at the film gate, and a rotatable compensating prism in each of said image beams and respectively including shutter elements for interrupting the respective beams during transition from one facet of the respective prism to the next, said compensating prisms and shutter elements being relatively displaced so that the prism elements will transmit their respective beams while the other of the beams is interrupted by the respective shutter element, whereby beams are continuously transmitted between an image plane and a film at the film gate and their respective images are alternately transmitted.

JAMES ARCHIBALD MAYTUM.

REFERENCES CITED

The following references are of record in the file of this patent:

UNITED STATES PATENTS

| Number | Name | Date |
|---|---|---|
| 721,954 | Huet et al. | Mar. 3, 1903 |
| 1,167,643 | Featherstone | Oct. 10, 1916 |
| 1,259,775 | Prucha et al. | Mar. 19, 1918 |
| 1,556,216 | Griffith | Oct. 6, 1925 |
| 2,175,185 | Ellsworth | Oct. 10, 1939 |
| 2,194,737 | Cathey | Mar. 26, 1940 |
| 2,240,728 | Vierling et al. | May 6, 1941 |
| 2,417,076 | Hickman | Mar. 11, 1947 |
| 2,422,816 | Baia | June 24, 1947 |

FOREIGN PATENTS

| Number | Country | Date |
|---|---|---|
| 343,244 | Italy | Mar. 27, 1936 |
| 550,665 | Germany | May 13, 1942 |